United States Patent

[11] 3,595,122

| [72] | Inventor | Mihai Brediceanu |
| | | 1019 James St., Syracuse, N.Y. 13203 |
| [21] | Appl. No. | 46,169 |
| [22] | Filed | June 15, 1970 |
| [45] | Patented | July 27, 1971 |

[54] PROGRAMMED SYSTEM FOR COMPLEX POLYTEMPI MUSIC AND BALLET PERFORMANCES
3 Claims, 1 Drawing Fig.

[52] U.S. Cl.................................................. 84/484,
58/130 E, 58/152 R, 250/219 Q, 340/309.1
[51] Int. Cl....................................................... G04f 5/02,
G04b 19/00
[50] Field of Search........................................... 84/484,
470; 58/130 R, 130 E, 145 R, 145 A; 340/309.1,
224; 179/1 H; 250/219, 219 DC; 317/127;
178/115

[56]      References Cited
         UNITED STATES PATENTS
2,420,802   5/1947   Thompson..................... 178/115

| 3,158,853 | 11/1964 | Coben.......................... | 340/309.1 |
| 3,290,507 | 12/1966 | Flieg et al. ..................... | 340/309.1 X |
| 3,530,341 | 9/1970 | Hutchinson ................... | 250/219 Q X |

Primary Examiner—Richard B. Wilkinson
Assistant Examiner—John F. Gonzales
Attorney—Bruns & Jenney ABSTRACT: A programmed system for polytempi music and dance has a mechanically operated timer with means for operating a group of electrical circuits to produce audio and visual signals at a preselected tempo for each circuit. Each circuit is connected to transmit an audio signal including a radio signal at the selected tempo, and a visual signal at the same tempo at a signal light in the orchestra. Each musician has a headphone to receive the audio signal for his group in the orchestra and each dancer has a miniaturized radio receiver and earphone to receive the radio signal for his group of dancers. A command system may also be provided to transmit verbal signals to a selected group or all of the groups of dancers and musicians.

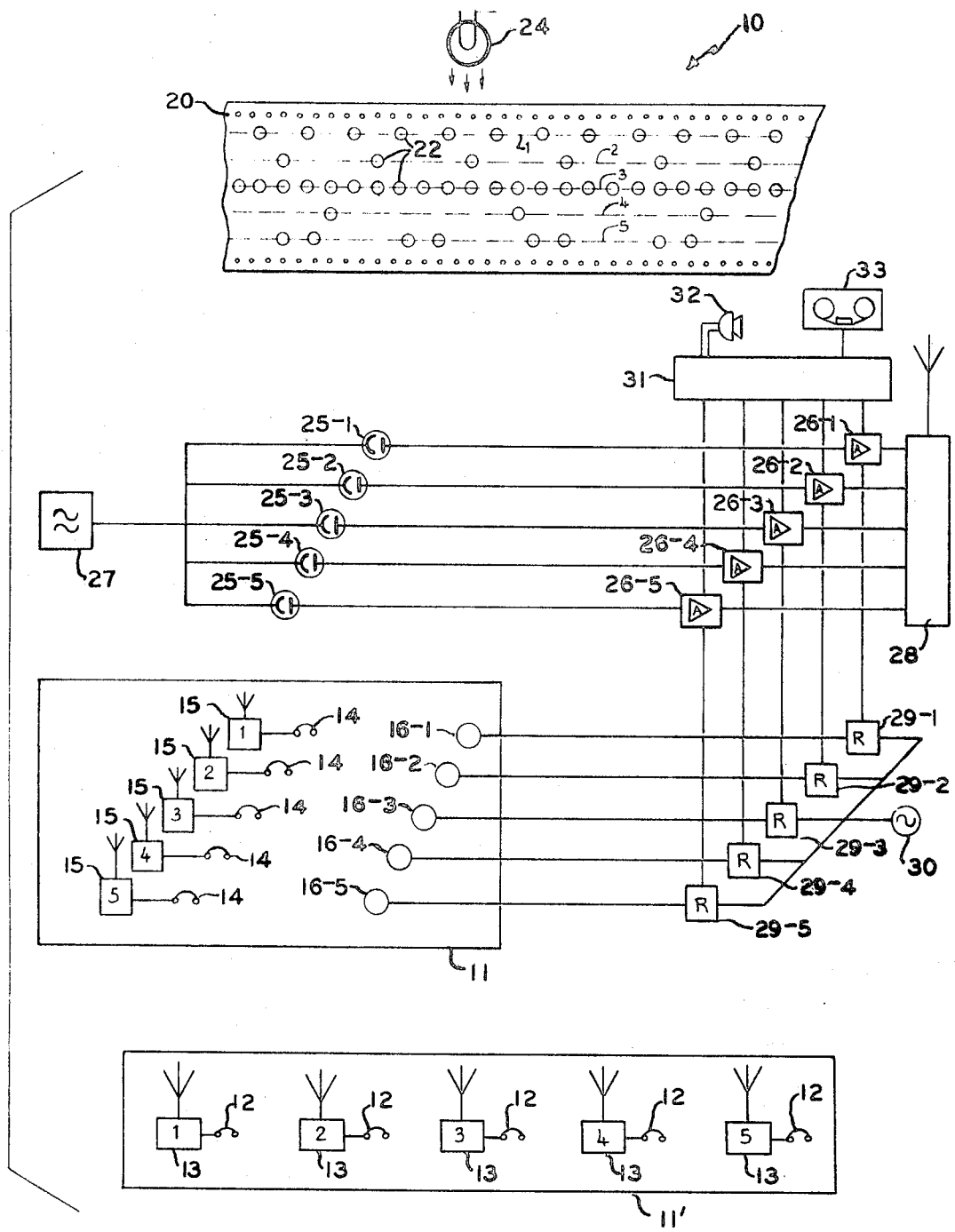

PROGRAMMED SYSTEM FOR COMPLEX POLYTEMPI MUSIC AND BALLET PERFORMANCES

BACKGROUND OF THE INVENTION

This invention relates to metronome systems and more particularly to a metronome producing signals at more than one tempo and includes means for communicating visual and audio signals to the musicians and audio signals to the dancers by radio.

Heretofore metronome signals have been manually given by the director of music or comprise mechanical means for producing audible and visible signals at one tempo. Some contemporary music is now being written at more than one tempo and ballets may be staged with one group moving at one tempo and another group at another tempo.

For example:

Five musicians, or five groups of musicians play simultaneously five different scores in different tempi. Five dancers, or five groups of dancers perform on the stage—each dancer (in case of five solo dancers), or each group of dancers (in case of five groups of dancers), in accordance with one of each tempi played by each musician or group of musicians. By "tempi" is understood the frequency of the beats in one minute, or as the metronome shows it $MM\text{-}\!\!\downarrow\!\!=60$, $MM\text{-}\!\!\downarrow\!\!=78$, $MM\text{-}\!\!\downarrow\!\!=132$, etc. Because of the rhythmical complexity of this type of music (several different tempi played at one time) it is practically impossible to dance on the stage several different choreographic patterns—each pattern coinciding with each one of the different tempi played simultaneously in the orchestra—the dancers on stage cannot perceive the different tempi individually and dance according to them.

SUMMARY OF THE INVENTION

The present invention provides a control center, mechanical or electronic, capable or coordinating the complex, time relations of the groups in the orchestra with different groups of dancers on stage. The center combines and directs visual and audio signals to the orchestra, by wire or radio or both, and audio signals by radio to the dancers on stage. The dancers are provided with miniature or easily concealed radio receivers and earphones. The musicians are provided with similar equipment or the earphones may be directly wired and they also have visual means, such as flashing signal lights, for receiving the tempo signals. The signals to musicians and dancers are coordinated and each group of dancers receive signals at the same tempo as the signals to the corresponding group of musicians playing music at the tempo timed with the movements of that group of dancers.

The control center includes a timer capable of being programmed to give signals at a plurality of tempi, means operated by the timer for transmitting electrical signals at the different tempi to radio transmitting means, and means for operating visual signals for the orchestra, all at preselected tempi originating at the timer.

Means are also provided for transmitting verbal or audible signals to all the musicians and dancers or to selected groups thereof, as desired.

BRIEF DESCRIPTION OF THE DRAWING

The single FIGURE of the drawing is a diagrammatic view of a multimetronome system according to the invention.

DESCRIPTION OF THE PREFERRED EMBODIMENT

The drawing shows a multimetronome system 10 for conveying audible and visual signals to a group of musicians assembled in an area 11, as in an orchestra pit, and, at the same time conveying the same audible signals to a group of ballet artists or dancers variably disposed in another area 11', as on a stage.

The dancers form a number of groups, here five, not necessarily grouped together but wherein each group dances at a different regular tempo. Similarly, the orchestra is formed into a similar number of groups, preferably each group being assembled together.

Each dancer is provided with an earphone 12, preferably of the inconspicuous or miniature type such as used in hearing aids. Each earphone 12 is connected to a radio receiver 13 of a type which can be worn inconspicuously on or in the clothing or otherwise concealed. Each dancer in group 1 wears a receiver denoted 1 in the drawing and each dancer in group 2 a receiver denoted 2, etc.

Each orchestra member is provided with an earphone 14 connected to a radio receiver 15, not necessarily inconspicuous, each musician in each group wearing the receiver denoted by the number of the group in the drawing. The different groups of musicians are grouped around and in sight of a signal light for his group, these lights being denoted 16–1 to 16–5, inclusive, in the drawing.

A timing device is provided for initiating timed signals to the receivers 13 and 15 and to the signal lights 16. In the drawing the timing device is shown as a perforated tape 20 moving at a constant speed and driven by any conventional means, not shown. Perforations at 22 are regularly spaced along parallel lines or rows, as shown, the rows being indicated by broken lines in the drawing and numbers 1—5, inclusive.

It will be noted that the perforations 22 along each row may be closely spaced for a fast tempo as in row 3 or widely spaced for a slow tempo as in row 4. The perforations may be each regularly spaced as in the first four rows or regularly spaced in pairs or other groups as in row 5.

Means associated with tape 20 for transmitting a signal include a light source 24 above the tape and a plurality of photorelays 25 below the tape, one for each of the five rows of perforations.

It will be understood that a photorelay comprises a photoelectric cell which operates a relay switch in an electric circuit and each of the photorelays 25 are spaced transversely so that light from the source 24 admitted through perforations 22 in row 1 fall on the beep" cell of photorelay 25–1 and light through the other rows fall on like-indicated photorelays 25–2 to 25–5, inclusive.

The switch of each photorelay 25 is connected in a circuit so as to connect, when operated, a respective amplifier 26–1, 26–2, etc. in circuit with an audiofrequency generator 27 which provides a pulse or pulses to the amplifier for producing the conventional "beep" tone in the receivers 13 and 15. Each amplifier 26 is connected to a radio transmitter 28, the transmitter being arranged to transmit signals from the respective amplifiers 26 on a different frequency, the receivers 13–1 and 15–1 being tuned to the wavelength of signals received from amplifier 26–1 and receivers 13–2 and 15–2 being tuned to the wavelength of signals from amplifier 26–2, etc.

Each amplifier 26 is also connected to a respective relay 29–1 to 29–5, the relays being connected in circuits between a source of electrical power 30 and signal lights 16–1 to 16–5, respectively, so as to flash the lights 16 upon each operation of the respective relay 29.

Preferably, there is a command system 31, provided with an input microphone 32 or a tape recorder 33, or both, for giving verbal signals over the transmitter 28. The command system 31 has a separate electrical connection with each amplifier 26 and comprises a manually operable switch in each of the electrical connections between the system and the amplifiers 26. Otherwise the system 31 is entirely conventional for electrically connecting the sound operated microphone 32 and tape recorder 33 to the amplifiers 26.

It will now be apparent that, according to the spacing of the perforations 22 in each row 1—5 of the tape and the speed of the tape, beep pulses from the generator 27 will be transmitted in the desired tempo for each row through transmitter 28 by operation of the photorelays 25. Each receiver 13 and 15 will receive the beep signals transmitted in the desired tempo for its group 1, 2, 3, 4 or 5. In addition each group of musicians will have the same desired tempo received visually from the flashing light 16 of his group, the relays 29 operating in synchronism with amplifiers 26.

When the director wishes to issue a command or signal to any one group or all groups he may close a selected switch or all switches of the command system 31 and issue a verbal command or signal over the microphone or such commands may be prerecorded and issued from the tape recorder 33.

It will be apparent that the radio receivers 15 for the orchestra may be dispensed with by providing direct electrical connections between the respective amplifiers 26 and earphones 14. Other conventional timer means than the perforated tape 20 may also be used, such as mechanical means employing cam means for operating mechanical switches in place of the photorelays 25.

It will also be apparent that the multimetronome system 10 may also be employed in conducting performances of varied tempi contemporary music such as the "Symphony No. 4" of Charles Ives or the "Gruppen" by Stockhausen without dancers. Alternatively the system can be used for dancers only, dancing to a prerecorded tape with music or audio signals taped or spoken. In addition, of course, visual signals for the dancers may be employed.

As will be apparent to those familiar with the art, the invention may be embodied in other specific forms without departing from the spirit or essential characteristics thereof.

I claim:

1. Metronome apparatus for signalling a plurality of tempi to artists performing at different tempi, comprising: a mechanically operated timer having a plurality of elements in a plurality of lines, the elements in each line being selectively regularly spaced to pass a given point at time spaced intervals, means continuously operable by each line of elements for operating a separate switch for each line of elements, each switch being in a separate electrical circuit including an audiofrequency generator, an amplifier and a relay, each amplifier being operably connected to at least one earphone, and each relay being operably connected in another separate circuit including an electrical source and at least one visual signal device, whereby each line of elements generates a regularly recurring audio signal at a chosen tempo which is conducted through an amplifier to a group of earphones worn by some of the artists and is conducted synchronously through a relay to one of the visual devices for transmitting different tempi to different orchestral artists.

2. Apparatus defined in claim 1 wherein each amplifier is additionally electrically connected to a radio transmitter for sending a radio signal, the radio signals from the amplifiers being at different wavelengths, and a plurality of radio receivers tuned to said different wavelengths, each receiver having an earphone, the receivers and connected earphones being adapted to be worn concealed by different dance artists, whereby the different tempi are also transmitted to different ballet dancers.

3. Apparatus defined in claim 2 wherein each amplifier is additionally operably connected to a voice operated electrical signalling device, whereby voice and additional audio signals may be transmitted at will to the artists through the earphones.